US012718758B2

(12) United States Patent
Kim et al.

(10) Patent No.: US 12,718,758 B2
(45) Date of Patent: Aug. 25, 2026

(54) DISPLAY DEVICE AND DRIVING METHOD THEREOF, AND ELECTRONIC DEVICE INCLUDING THEREOF

(71) Applicant: Samsung Display Co., LTD., Yongin-si (KR)

(72) Inventors: Jong Keun Kim, Yongin-si (KR); Jung Kook Park, Yongin-si (KR); Dong Hak Pyo, Yongin-si (KR); So Young Kim, Yongin-si (KR); Kon Haeng Lee, Yongin-si (KR); Seok Hyun Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/967,436

(22) Filed: Dec. 3, 2024

(65) Prior Publication Data

US 2025/0299630 A1 Sep. 25, 2025

(30) Foreign Application Priority Data

Mar. 19, 2024 (KR) ........................ 10-2024-0037758

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2300/0842* (2013.01); *G09G 2310/08* (2013.01); *G09G 2320/0233* (2013.01); *G09G 2320/0238* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 11,676,536 | B2 | 6/2023 | Chae et al. | |
| 11,699,402 | B2 | 7/2023 | Koo et al. | |
| 2018/0174525 | A1* | 6/2018 | Kim | G09G 3/3291 |
| 2021/0201764 | A1* | 7/2021 | Oh | G09G 3/3233 |
| 2022/0358884 | A1* | 11/2022 | Chae | G09G 3/3233 |

FOREIGN PATENT DOCUMENTS

| | | | |
|---|---|---|---|
| KR | 10-2022-0152481 | A | 11/2022 |
| KR | 10-2023-0067896 | A | 5/2023 |

* cited by examiner

*Primary Examiner* — Ifedayo B Iluyomade
(74) *Attorney, Agent, or Firm* — Womble Bond Dickinson (US) LLP

(57) ABSTRACT

A display device according to embodiments of the present disclosure includes a pixel including a light-emitting element, and an initialization transistor configured to control an amount of current flowing from a first power line to a second power line via the light-emitting element, and configured to receive a voltage of an initialization power supply from a third power line, and an initialization power supply configured to supply a first voltage as the voltage, and configured to supply a second voltage as the voltage, which is larger than the first voltage, to the third power line during an offset period when a load connected to the third power line is reduced during one frame period.

13 Claims, 10 Drawing Sheets

DISPLAY DEVICE AND DRIVING METHOD THEREOF, AND ELECTRONIC DEVICE INCLUDING THEREOF

CROSS-REFERENCE TO RELATED APPLICATION

The present application claims priority to, and the benefit of, Korean Patent Application No. 10-2024-0037758 filed in the Korean Intellectual Property Office on Mar. 19, 2024, the entire disclosure of which is incorporated herein by reference.

BACKGROUND

1. Field

The present disclosure relates to a display device, a driving method thereof, and an electronic device including thereof.

2. Description of the Related Art

As an information technology is developed, an importance of a display device, which is a connection medium between users and information, has been highlighted. Therefore, a display device, such as a liquid crystal display device, an organic light-emitting diode display device, and the like has been increasingly used.

The display device can display images using pixels. The pixels included in the display device may be set to a non-emitting state at least twice during one frame period. For example, the pixels may be connected to an initialization power line, and a light-emitting element included in each pixel can receive a voltage of the initialization power supply at least twice during one frame period. Here, when a load of the initialization power line is not constant, voltages of the initialization power supply supplied to pixels may be set to be different from each other.

SUMMARY

One aspect of the present disclosure provides a display device, a driving method thereof, and an electronic device including thereof that apply an offset voltage so that the voltage of the initialization power supply is constantly supplied to the pixel.

A display device according to embodiments of the present disclosure includes a pixel including a light-emitting element, and an initialization transistor configured to control an amount of current flowing from a first power line to a second power line via the light-emitting element, and configured to receive a voltage of an initialization power supply from a third power line, and an initialization power supply configured to supply a first voltage as the voltage, and configured to supply a second voltage as the voltage, which is larger than the first voltage, to the third power line during an offset period when a load connected to the third power line is reduced during one frame period.

The initialization power supply may be configured to supply the first voltage to the third power line during a period other than the offset period of the one frame period.

The second voltage may have a value that is a sum of the first voltage and an offset voltage that has a value of the voltage of the initialization power supply that decreases as a load connected to the third power line decreases.

The display device may further include a sensor configured to sense the voltage of the third power line, and to control the initialization power supply in response to a sensed voltage.

An offset signal may be configured to be output to the initialization power supply when the sensor senses a decrease in the voltage of the third power line, wherein the initialization power supply is configured to supply the second voltage to the third power line upon receiving the offset signal.

The display device may further include a memory configured to store a value of the second voltage, wherein the initialization power supply is configured to supply the second voltage to the third power line based on the value of the second voltage stored in the memory upon receiving the offset signal.

The display device may further include a memory configured to store start and end points of the offset period, and to store a value of the second voltage, and a controller configured to control the initialization power supply.

The controller may be configured to control the initialization power supply to supply the second voltage to the third power line during the offset period.

The initialization transistor may be configured to be turned on when a first scan signal is supplied to a first scan line, wherein the first scan signal is configured to be supplied at least twice during the one frame period.

A driving method of a display device according to one or more embodiments of the present disclosure includes supplying a first voltage from an initialization power supply to a pixel through an initialization power line during a first period of one frame period, and supplying a second voltage, which is larger than the first voltage, from the initialization power supply to the pixel during a second period of the one frame period after the first period, and during which a load connected to the initialization power line is reduced.

A load connected to the initialization power line during the first period may be different from a load connected to the initialization power line during the second period.

The second voltage may have a value that is a sum of the first voltage and an offset voltage that has a value of the voltage of the initialization power supply that decreases as a number of loads connected to the initialization power line decreases.

The driving method may further include supplying the initialization power supply having the first voltage to the pixel during a third period after the second period of the one frame period.

The driving method may further include supplying, to the pixel, the voltage of the initialization power supply at least twice during the one frame period.

The display device according to embodiments of the present disclosure apply an offset voltage during a period when the load on the initialization power line decreases, so that initialization power supply of substantially the same voltage is supplied to the pixels, thereby improving display quality.

An electronic device according to embodiments of the present disclosure includes processor to provide input image data and a display device to display an image based on the input image data, wherein the display device includes a pixel comprising a light-emitting element, and an initialization transistor configured to control an amount of current flowing from a first power line to a second power line via the light-emitting element, and configured to receive a voltage of an initialization power supply from a third power line, and an initialization power supply configured to supply a first voltage as the voltage, and configured to supply a second voltage as the voltage, which is larger than the first voltage, to the third power line during an offset period when a load connected to the third power line is reduced during one frame period.

DETAILED DESCRIPTION

Figure 1:
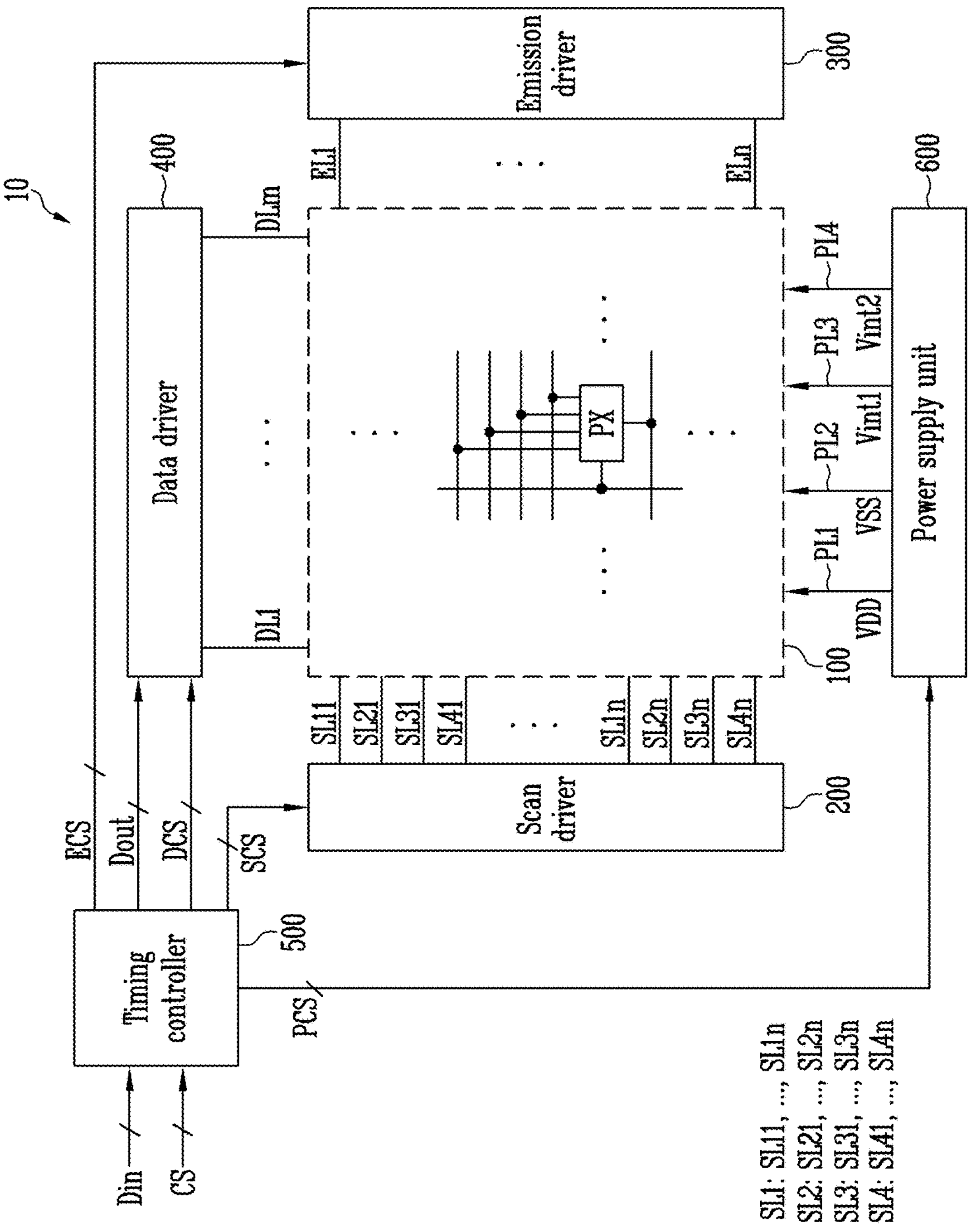
FIG. 1 is a drawing showing a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like.

In describing embodiments, an expression of connection indicates electrical connection unless explicitly described to be direct connection, and "directly connected/directly coupled," or "directly on," refers to one component directly connecting or coupling another component, or being on another component, without an intermediate component. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In addition, the expression "the same" in the description may mean "substantially the same". That is, it may be the same degree to which a person with ordinary knowledge can convince as the same. Other expressions may also be expressions in which "substantially" is omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a drawing illustrating a display device according to one or more embodiments of the present disclosure.

Referring to FIG. 1, a display device according to one or more embodiments of the present disclosure includes a display (e.g., a pixel unit) 100, a scan driver 200, an emission driver 300, a data driver 400, a timing controller 500, and a power supply (e.g., a power supply unit, or a voltage supply) 600.

The display device 10 may display images at various frame frequencies (or driving frequencies, refresh rates, or screen refresh rates) depending on driving conditions. The frame frequency may be a frequency at which data voltage is substantially written to the driving transistor of the pixel PX for one second. For example, the frame frequency may be also referred to as a screen refresh rate or a screen playing frequency, and may represent a frequency at which a display screen is played per second.

In one or more embodiments, a frequency of the second scan signal supplied to the second scan line SL2 to supply the data signal may be changed in response to the frame frequency. For example, the frame frequency for driving a video may be a frequency of about 60 Hz or more (e.g., 60 Hz, 120 Hz, or 240 Hz). When the frame frequency is 60 Hz, the second scan signal of 60 times per second may be supplied to each horizontal line (or pixel row).

In one or more embodiments, the display device 10 may adjust the output frequencies of the scan driver 200 and the emission driver 300 and the output frequency of the data driver 400 corresponding thereto depending on driving conditions. For example, the display device 10 may display images in response to various frame frequencies of 1 Hz to 120 Hz. However, this is an example, and the display device 10 may display an image at a frame frequency of 120 Hz or more (e.g., 240 Hz, 480 Hz).

The display 100 may include scan lines SL11 to SL**1*n*, SL21 to SL2*n*, SL31 to SL3*n*, SL41 to SL4*n*, emission control lines EL1 to ELn, and data lines DL1 to DLm, and may include pixels PX connected to the scan lines SL11 to SL1*n*, SL21 to SL2*n*, SL31 to SL3*n*, SL41 to SL4*n*, the emission control lines EL1 to ELn, and the data lines DL1** to DLm (here, n and m are natural numbers of two or more). Each of the pixels PX may include a light-emitting element and a driving transistor.

The timing controller 500 may receive input data Din and control signals CS from a host system, such as an application processor (AP) through a predetermined interface. The input data Din may include image data.

The timing controller 500 may control the driving timing of the scan driver 200, the emission driver 300, and the data driver 400. Additionally, the timing controller 500 may control the power supply 600.

The timing controller 500 may generate a scan drive signal SCS, an emission drive signal ECS, a data drive signal DCS, and a power drive signal PCS. The scan drive signal SCS, the emission drive signal ECS, the data drive signal DCS, and the power drive signal PCS may be supplied to the scan driver 200, the emission driver 300, the data driver 400, and the power supply 600, respectively. Additionally, the timing controller 500 may correct (or reorder) the input data Din to generate output data Dout and to supply the output data Dout to the data driver 400.

The scan driver 200 may supply a first scan signal, a second scan signal, a third scan signal, and a fourth scan signal to first scan lines SL1, second scan lines SL2, third scan lines SL3, and fourth scan lines SL4, respectively, based on the scan drive signal SCS. For example, the scan driver 200 may sequentially supply the first scan signal to the first scan lines SL1. For example, the scan driver 200 may sequentially supply the second scan signal to the second scan lines SL2. For example, the scan driver 200 may sequentially supply the third scan signal to the third scan lines SL3. For example, the scan driver 200 may sequentially supply the fourth scan signal to the fourth scan lines SL4.

Each of the first to fourth scan signals may be set to a gate-on voltage corresponding to the type of transistor receiving the corresponding scan signal. The transistor receiving the scan signal may be set to a turn-on state when the scan signal is supplied. For example, the gate-on voltage of the scan signal supplied to a P-channel metal oxide semiconductor (PMOS) transistor may be a logic low level, and the gate-on voltage of the scan signal supplied to an N-channel metal oxide semiconductor (NMOS) transistor may be a logic high level. Hereinafter, the meaning of "a scan signal is supplied" may be understood as that the scan signal is supplied at a logic level that turns on the transistor controlled thereby. Additionally, the meaning of "supply of the scan signal is stopped" may be understood as that the scan signal is supplied at a logic level that turns off the transistor controlled thereby.

The emission driver 300 may supply an emission control signal to the emission control lines EL1 to ELn based on the emission drive signal ECS. The emission driver 300 may sequentially supply emission control signals to the emission control lines EL1 to ELn.

The emission control signal may be set to the gate-off voltage. The transistor that receives the emission control signal may be set to be turned off when the emission control signal is supplied, and to be turned on in other cases. Hereinafter, the meaning of "the emission control signal is supplied" may be understood as that the emission control signal is supplied at a logic level that turns off the transistor controlled thereby. Additionally, the meaning of "supply of the emission control signal is stopped" may be understood as that the emission control signal is supplied at a logic level that turns on the transistor controlled thereby.

In FIG. 1, for convenience of description, each of the scan driver 200 and the emission driver 300 are shown as a single configuration, but the present disclosure is not limited thereto. According to the design, the scan driver 200 may include a plurality of scan drivers each supplying at least one of the first to fourth scan signals. In addition, at least a portion of the scan driver 200 and the emission driver 300 may be integrated into one driving circuit, module, or the like.

Additionally, the number of scan lines SL1, SL2, SL3, and SL4 may be set differently depending on the structure of the pixels PX. For example, the third scan line SL3 and/or the fourth scan line SL4 may be omitted depending on the structure of the pixels PX. Additionally, the emission control lines EL1 to ELn may be omitted depending on the structure of the pixels PX.

The data driver 400 may receive a data drive signal DCS, and may output data Dout from the timing controller 500. The data driver 400 may convert digital output data Dout into an analog data signal (or data voltage) in response to control of the data driving signal DCS. The data driver 400 may supply data signals to the data lines DL1 to DLm. For example, the data driver 400 may supply a data signal to the data lines DL1 to DLm in synchronization with the second scan signal sequentially supplied to the second scan lines SL21 to SL2*n*.

The power supply 600 may generate voltages of a first driving power supply VDD, a second driving power supply VSS, a first initialization power supply Vint1, and a second initialization power supply Vint2 based on the power drive signal PCS to supply it to the pixels PX. The first driving power supply VDD may be supplied to the pixels PX via the first power line PL1. The second driving power supply VSS may be supplied to the pixels PX via the second power line PL2. The first initialization power supply Vint1 may be supplied to the pixels PX via the third power line PL3. The second initialization power supply Vint2 may be supplied to the pixels PX via the fourth power line PL4.

Figure 2:
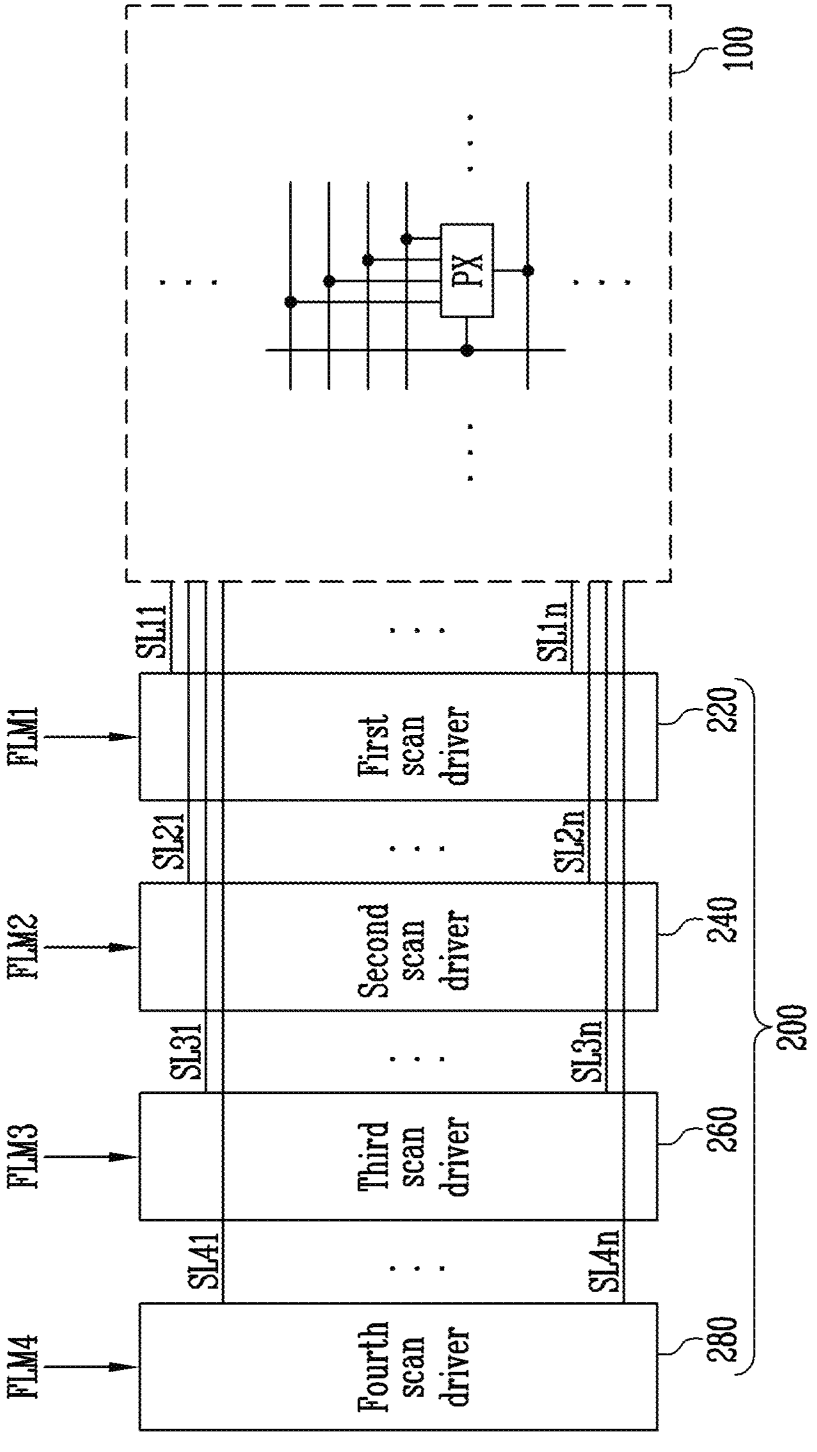
FIG. 2 is a drawing showing one or more embodiments of a scan driver included in a display device of FIG. 1.

FIG. 2 is a drawing showing one or more embodiments of a scan driver included in a display device of FIG. 1.

Referring to FIG. 2, the scan driver 200 may include a first scan driver 220, a second scan driver 240, a third scan driver 260, and a fourth scan driver 280.

The scan drive signal SCS may include a first start signal FLM1, a second start signal FLM2, a third start signal FLM3, and a fourth start signal FLM4. The first start signal FLM1, the second start signal FLM2, the third start signal FLM3, and the fourth start signal FLM4 may be supplied to the first scan driver 220, the second scan driver 240, the third scan driver 260, and the fourth scan driver 280, respectively. The width and supply timing of the first to fourth start signals FLM1 to FLM4 may be determined depending on the driving conditions and frame frequency of the pixel PX.

The first scan driver 220 may sequentially supply the first scan signal to the first scan lines SL11 to SL1*n* in response to the first start signal FLM1. The second scan driver 240 may sequentially supply the second scan signal to the second scan lines SL21 to SL2*n* in response to the second start signal FLM2. The third scan driver 260 may sequentially supply the third scan signal to the third scan lines SL31 to SL3*n* in response to the third start signal FLM3. The fourth scan driver 280 may sequentially supply the fourth scan signal to the fourth scan lines SL41 to SL4*n* in response to the fourth start signal FLM4.

Figure 3:
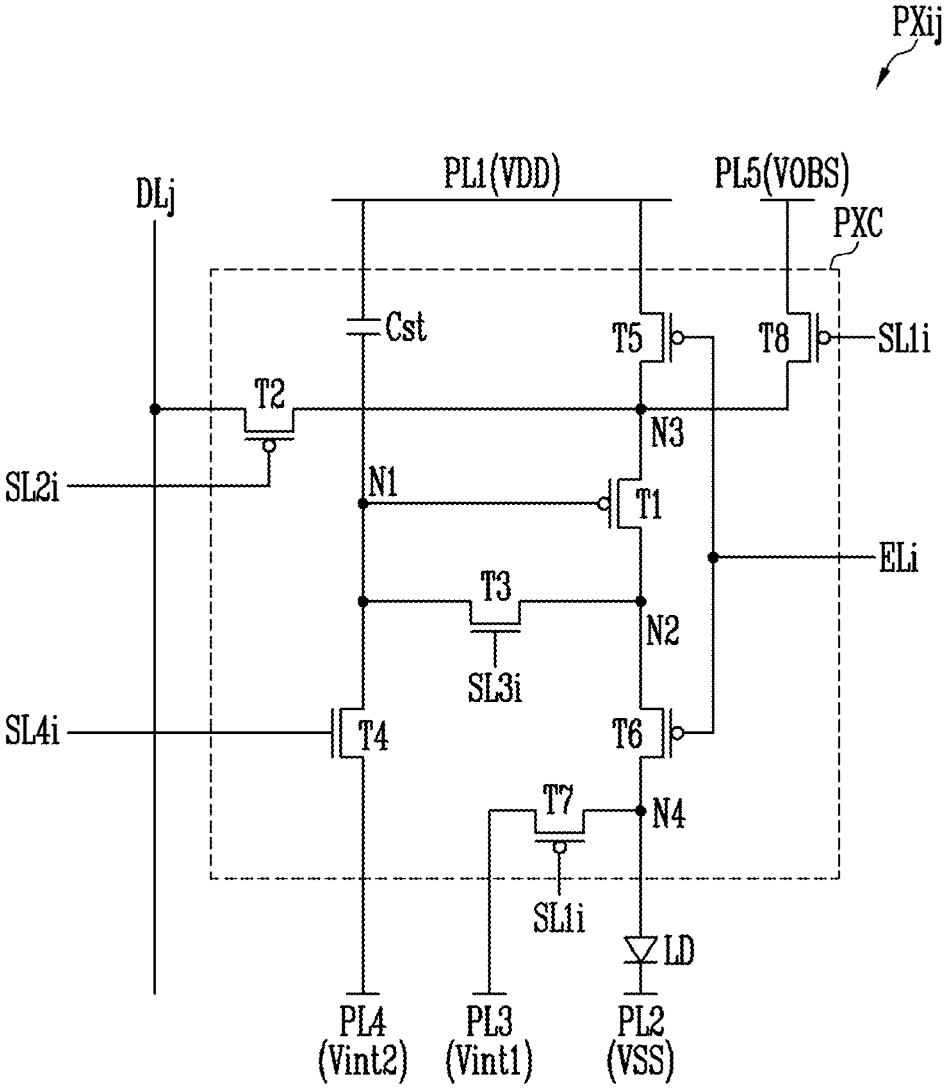
FIG. 3 is a drawing showing one or more embodiments of a pixel included in a display device of FIG. 1.

FIG. 3 is a drawing illustrating one or more embodiments of a pixel shown in FIG. 1.

In FIG. 3, for convenience of description, a pixel located on the i-th horizontal line (or i-th pixel row) and connected to the j-th data line DLj will be shown (here, i and j are natural number of n or less).

Referring to FIG. 3, the pixel PXij according to one or more embodiments of the present disclosure may include a light-emitting element LD and a pixel circuit PXC.

The first electrode (or anode electrode) of the light-emitting element LD may be connected to the pixel circuit PXC, and the second electrode (or cathode electrode) thereof may be connected to the second power line PL2 to which the second driving power supply VSS is supplied. The light-emitting element LD may generate light of a certain luminance in response to the amount of current supplied from the pixel circuit PXC.

The light-emitting element LD may be selected as an organic light-emitting diode. Additionally, the light-emitting element LD may be selected as an inorganic light-emitting diode, such as a micro LED (light-emitting diode) or a quantum dot light-emitting diode. Additionally, the light-emitting element LD may be an element including a composite of organic and inorganic materials. In FIG. 3, the pixel PX includes a single light-emitting element LD. However, in one or more other embodiments, the pixel PX may include a plurality of light-emitting elements, and the plurality of light-emitting elements may be connected in series, in parallel, or in series or parallel with each other.

The pixel circuit PXC may control the amount of current supplied to the light-emitting element LD in response to the data signal supplied from the data line DLj. For example, the pixel circuit PXC may control the amount of current supplied from the first power line PL1 (or first driving power supply VDD) to the second power line PL2 (or second driving power supply VSS) via the light-emitting element LD in response to the data signal. To this end, the pixel circuit PXC may include at least one transistor and a capacitor. The pixel circuit PXC may be implemented with various types of circuits currently known.

In one or more embodiments, the pixel circuit PXC may be connected to the second scan line SL2*i*, the third scan line SL3*i*, the fourth scan line SL4*i*, and the emission control line ELi. The pixel circuit PXC may be connected to the first power line PL1 to which the first driving power supply VDD is supplied, the third power line PL3 to which the first initialization power supply Vint1 is supplied, the fourth power line PL4 to which the second initialization power supply Vint2 is supplied, and the fifth power line PL5 to which the bias voltage VOBS is supplied.

The pixel circuit PXC may include first to eighth transistors T1 to T8 and a storage capacitor Cst.

The first electrode of the first transistor T1 (or driving transistor) may be connected to the third node N3, and the second electrode thereof may be connected to the second node N2. Additionally, the gate electrode of the first transistor T1 may be connected to the first node N1. The first transistor T1 may control the amount of current supplied from the first driving power supply VDD to the second driving power supply VSS via the light-emitting element LD in response to the voltage of the first node N1. To this end, the first driving power supply VDD may be set to a higher voltage than the second driving power supply VSS.

The second transistor T2 may be connected between the data line DLj and the third node N3. Additionally, the gate electrode of the second transistor T2 may be connected to the second scan line SL2*i*. The second transistor T2 may be turned on when the second scan signal is supplied to the second scan line SL2*i* to electrically connect the data line DLj and the third node N3.

The third transistor T3 may be connected between the first node N1 and the second node N2. Additionally, the gate electrode of the third transistor T3 may be connected to the third scan line SL3*i*. The third transistor T3 may be turned on when the third scan signal is supplied to the third scan line SL3*i* to electrically connect the first node N1 and the second node N2. When the third transistor T3 is turned on, the first transistor T1 may be connected in a form of a diode.

The fourth transistor T4 may be connected between the first node N1 and the fourth power line PL4 to which the second initialization power Vint2 is supplied. The gate electrode of the fourth transistor T4 may be connected to the fourth scan line SL4*i*. The fourth transistor T4 may be turned on when the fourth scan signal is supplied to the fourth scan line SL4*i* to supply the voltage of the second initialization power supply Vint2 to the first node N1. Here, the voltage of the second initialization power supply Vint2 may be set to a lower voltage than the data signal supplied to the data line DLj.

The fifth transistor T5 may be connected between the first power line PL1, to which the first driving power VDD is supplied, and the third node N3. Additionally, the gate electrode of the fifth transistor T5 may be connected to the emission control line ELi. The fifth transistor T5 may be turned off when the emission control signal is supplied to the emission control line ELi, and may be turned on in other cases.

The sixth transistor T6 may be connected between the second node N2 and the fourth node N4. Additionally, the gate electrode of the sixth transistor T6 may be connected to the emission control line ELi. The sixth transistor T6 may be turned off when the emission control signal is supplied to the emission control line ELi, and may be turned on in other cases. Meanwhile, in FIG. 4, the fifth transistor T5 and the sixth transistor T6 are shown as connected to the same emission control line ELi, but the present disclosure is not limited thereto. In one or more embodiments, the fifth transistor T5 and the sixth transistor T6 may be connected to different emission control lines.

Meanwhile, the first initialization power supply Vint1 and the second initialization power supply Vint2 may be set to different voltages. That is, the voltage supplied to the first electrode of the light-emitting element LD and the voltage supplied to the gate electrode of the first transistor T1 may be set differently. However, this is an example, and the voltage of the first initialization power supply Vint1 and the voltage of the second initialization power supply Vint2 may be substantially the same.

The seventh transistor (e.g., an initialization transistor) T7 may be connected between the first electrode of the light-emitting element LD and the third power line PL3 to which the first initialization power Vint1 is supplied. Additionally, the gate electrode of the seventh transistor T7 may be connected to the first scan line SL1*i*. The seventh transistor T7 may be turned on when the first scan signal is supplied to the first scan line SL1*i* to supply the voltage of the first initialization power supply Vint1 to the first electrode of the light-emitting element LD. The scan driver 200 may supply the first scan signal to the first scan line SL1*i* at least twice during one frame period.

When the voltage of the first initialization power supply Vint1 is supplied to the first electrode of the light-emitting element LD, the parasitic capacitor of the light-emitting element LD may be discharged. As the residual voltage charged in the parasitic capacitor of the light-emitting element LD is discharged (or removed), the likelihood of unintended micro-emission can be reduced or prevented. Accordingly, the black expression ability of the pixel PXij can be improved.

The eighth transistor T8 may be connected between the third node N3 and the fifth power line PL5 to which the bias voltage VOBS is supplied. Additionally, the gate electrode of the eighth transistor T8 may be connected to the first scan line SL1*i*. The eighth transistor T8 may be turned on when the first scan signal is supplied to the first scan line SL1*i* to supply the bias voltage VOBS to the third node N3.

The storage capacitor Cst may be connected between the first power line PL1 and the first node N1. The storage capacitor Cst may store the voltage applied to the first node N1.

Figure 4:
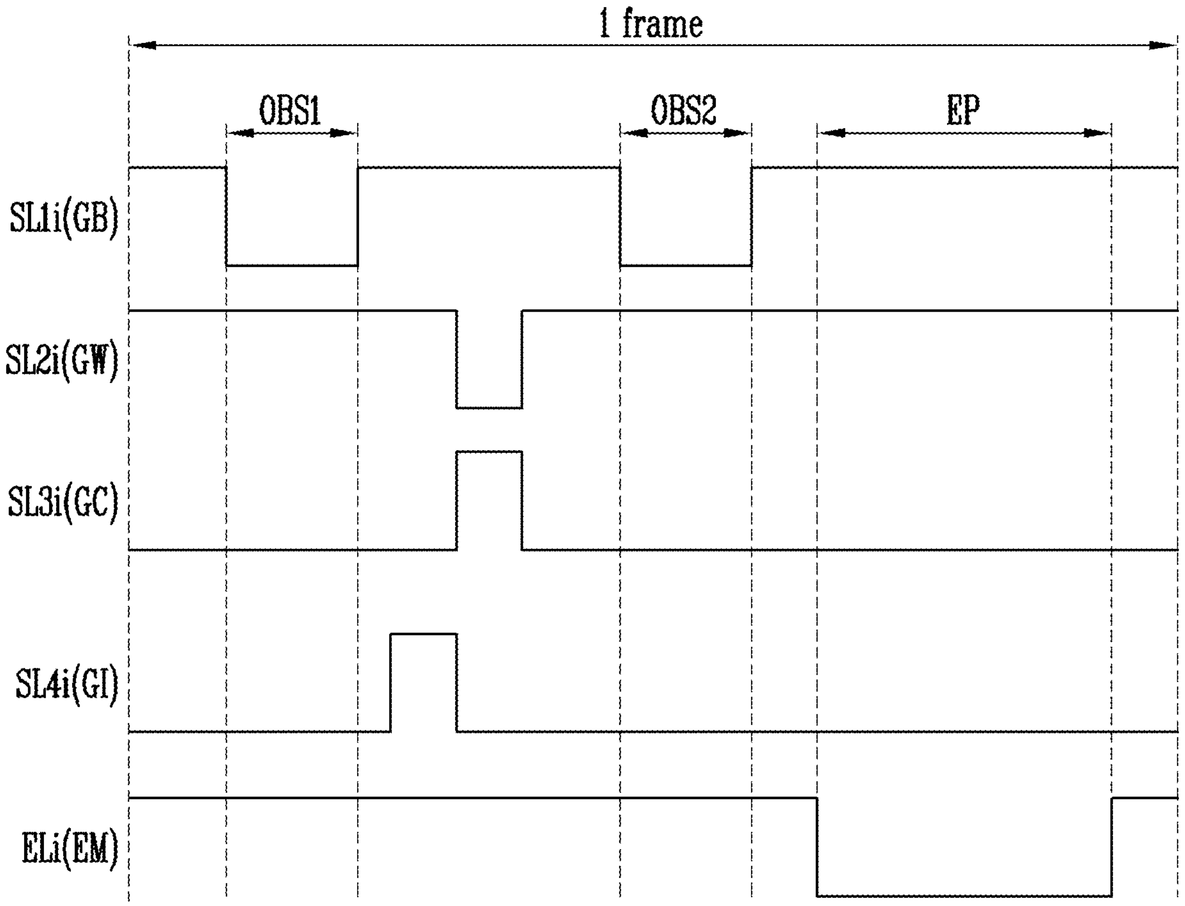
FIG. 4 is a waveform diagram showing a driving method of a pixel shown in FIG. 3.

FIG. 4 is a waveform diagram showing a driving method of a pixel shown in FIG. 3. FIG. 4 may show a driving waveform supplied during one frame period.

Referring to FIG. 4, one frame period may include an emission period EP and a non-emission period. In the drawing, a period other than those indicated as the emission period EP may correspond to the non-emission period. The non-emission period may include a first bias period OBS1 and a second bias period OBS2.

Thereinafter, the operation process will be described. First, the fifth transistor T5 and the sixth transistor T6 may be turned off by the emission control signal EM supplied to the emission control line ELi during the non-emission period. When the fifth transistor T5 and the sixth transistor T6 are turned off, the electrical connection between the first power line PL1 and the light-emitting element LD may be cut off, and thus the light-emitting element LD may be set to a non-emitting state.

During the first bias period OBS1, the first scan signal GB may be supplied to the first scan line SL1*i*, and the seventh transistor T7 and the eighth transistor T8 may be turned on. When the seventh transistor T7 and the eighth transistor T8 are turned on, the voltage of the first initialization power supply Vint1 may be supplied to the fourth node N4, and the bias voltage VOBS may be supplied to the third node N3. Accordingly, the first electrode of the light-emitting element LD may be initialized to the voltage of the first initialization power supply Vint1, and the bias of the first transistor T1 may be initialized.

Thereafter, the fourth scan signal GI may be supplied to the fourth scan line SL4*i* to turn on the fourth transistor T4. When the fourth transistor T4 is turned on, the voltage of the second initialization power supply Vint2 may be supplied to the first node N1, and accordingly, the first node N1 may be initialized with the voltage of the second initialization power supply Vint2.

Thereafter, the second scan signal GW may be supplied to the second scan line SL2*i*, and the third scan signal GC may be supplied to the third scan line SL3*i*. When the second scan signal GW is supplied to the second scan line SL2*i*, the second transistor T2 may be turned on. When the third scan signal GC is supplied to the third scan line SL3*i*, the third transistor T3 may be turned on.

When the second transistor T2 is turned on, the data line DLj and the third node N3 may be electrically connected, and thus, the data signal may be supplied from the data line DLj to the third node N3. When the third transistor T3 is turned on, the first transistor T1 is connected in a diode form. In this case, the data signal supplied to the third node N3 may be supplied to the first node N1 via the first transistor T1 connected in the form of a diode. Accordingly, a data signal and a voltage corresponding to the threshold voltage of the first transistor T1 may be applied to the first node N1. The storage capacitor Cst may store the voltage applied to the first node N1.

After the data signal and the voltage corresponding to the threshold voltage of the first transistor T1 are stored in the storage capacitor Cst, the first scan signal GB may be supplied to the first scan line SL1*i* during the second bias period OBS2. When the first scan signal GB is supplied to the first scan line SL1*i*, the seventh transistor T7 and the eighth transistor T8 may be turned on. When the seventh transistor T7 and the eighth transistor T8 are turned on, the voltage of the first initialization power supply Vint1 may be supplied to the fourth node N4, and the bias voltage VOBS may be supplied to the third node N3. And accordingly, the first electrode of the light-emitting element LD may be initialized to the voltage of the first initialization power supply Vint1, and the bias of the first transistor T1 may be initialized.

Thereafter, the supply of the emission control signal EM to the emission control line ELi may be stopped. When the supply of the emission control signal EM is stopped, the fifth transistor T5 and the sixth transistor T6 may be turned on. When the fifth transistor T5 and the sixth transistor T6 are turned on, the first power line PL1 may be electrically connected to the first electrode of the light-emitting element LD via the fifth transistor T5, the first transistor T1, and the sixth transistor T6. At this time, the first transistor T1 may supply a driving current corresponding to the voltage applied to the first node N1 to the light-emitting element LD, and the light-emitting element LD may emit light with luminance corresponding to the driving current. That is, the light-emitting element LD may emit light with luminance corresponding to the driving current during the emission period EP after the non-emission period.

In one or more embodiments, one frame period may include a porch period. The porch period may be a period between after scan signals are applied to the last scan line of one frame and data is output, and before scan signals are applied to the first scan line of the next frame and data is output.

Figure 5:
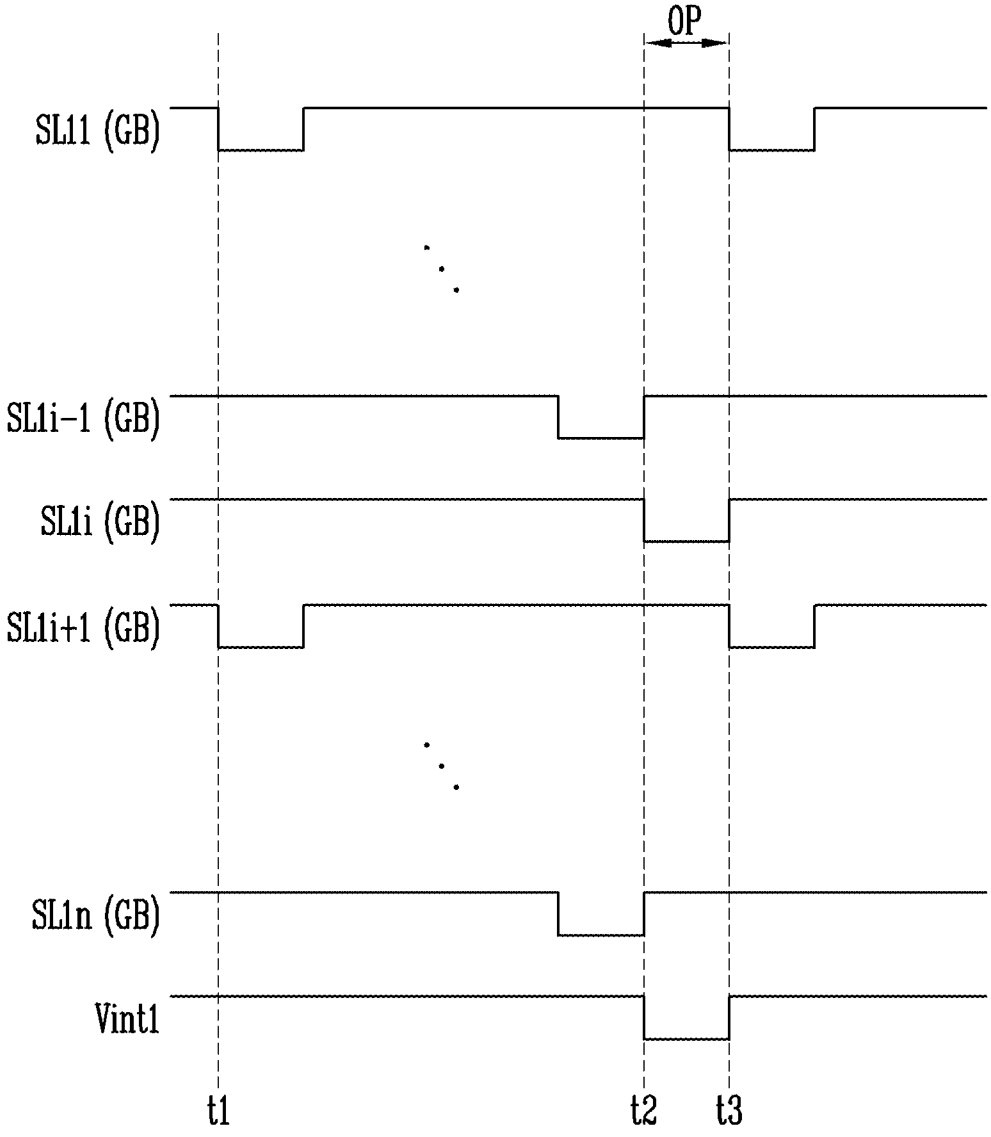
FIG. 5 is a drawing showing a first scan signal supplied to a first scan line during one frame period.

FIG. 5 is a drawing showing a first scan signal supplied to a first scan line during one frame period.

Referring to FIGS. 4 and 5, one frame period may include a first bias period OBS1 and a second bias period OBS2. Additionally, the scan driver 200 may sequentially supply the first scan signal GB to the first scan lines SL11 to SL1*n* during the first bias period OBS1 and the second bias period OBS2.

In this case, the first scan signal GB may be supplied to two first scan lines of the first scan lines SL11 to SL1*n* in the first period of one frame period, and the first scan signal GB may be supplied to one first scan line thereof in the second period different from the first period.

For example, at the first time point t1, the first scan signal GB supplied to the first scan line SL11 corresponding to the first bias period OBS1, and the first scan signal GB supplied to the first scan line SL1*i*+1 corresponding to the second bias period OBS2, may overlap each other. For example, the first period in which the first scan signal GB is supplied to the two first scan lines may include a period between the first time point t1 and the second time point t2, and may include a period exceeding/after the third time point t3.

Meanwhile, referring to the offset period OP between the second time point t2 and the third time point t3, only the first scan signal GB may be supplied to the first scan line SL1*i* corresponding to the first bias period OBS1, but the first scan signal corresponding to the second bias period OBS2 may not be supplied thereto. In one or more embodiments, the offset period OP may be a porch period within one frame. Accordingly, the second period during which the first scan signal GB is supplied to one first scan line may be the offset period OP.

Meanwhile, when the number of first scan lines to which the first scan signal GB is supplied is set differently, the load of the third power line PL3 may be set differently. For example, the load connected to the third power line PL3 during the first period may be different from the load connected to the third power line PL3 during the second period. That is, the second period may be a period in which the load connected to the third power line PL3 is reduced during one frame period.

When the load of the third power line PL3 is set differently during the first period and the second period, the voltages of the first initialization power supplies Vint1 supplied in the first period and the second period may be set differently.

For example, during the offset period OP between the time point t2 and the time point t3 when the load is reduced, the voltage of the first initialization power supply Vint1 may be reduced. When the first initialization power supply Vint1 with different voltages is supplied to the pixels PX in the first period and the second period, non-uniform luminance may be displayed in the pixels PX in response to the same data signal. To reduce or prevent the likelihood of this, one or more embodiments of the present disclosure provides a method of applying the offset voltage VOS during the second period.

Figure 6:
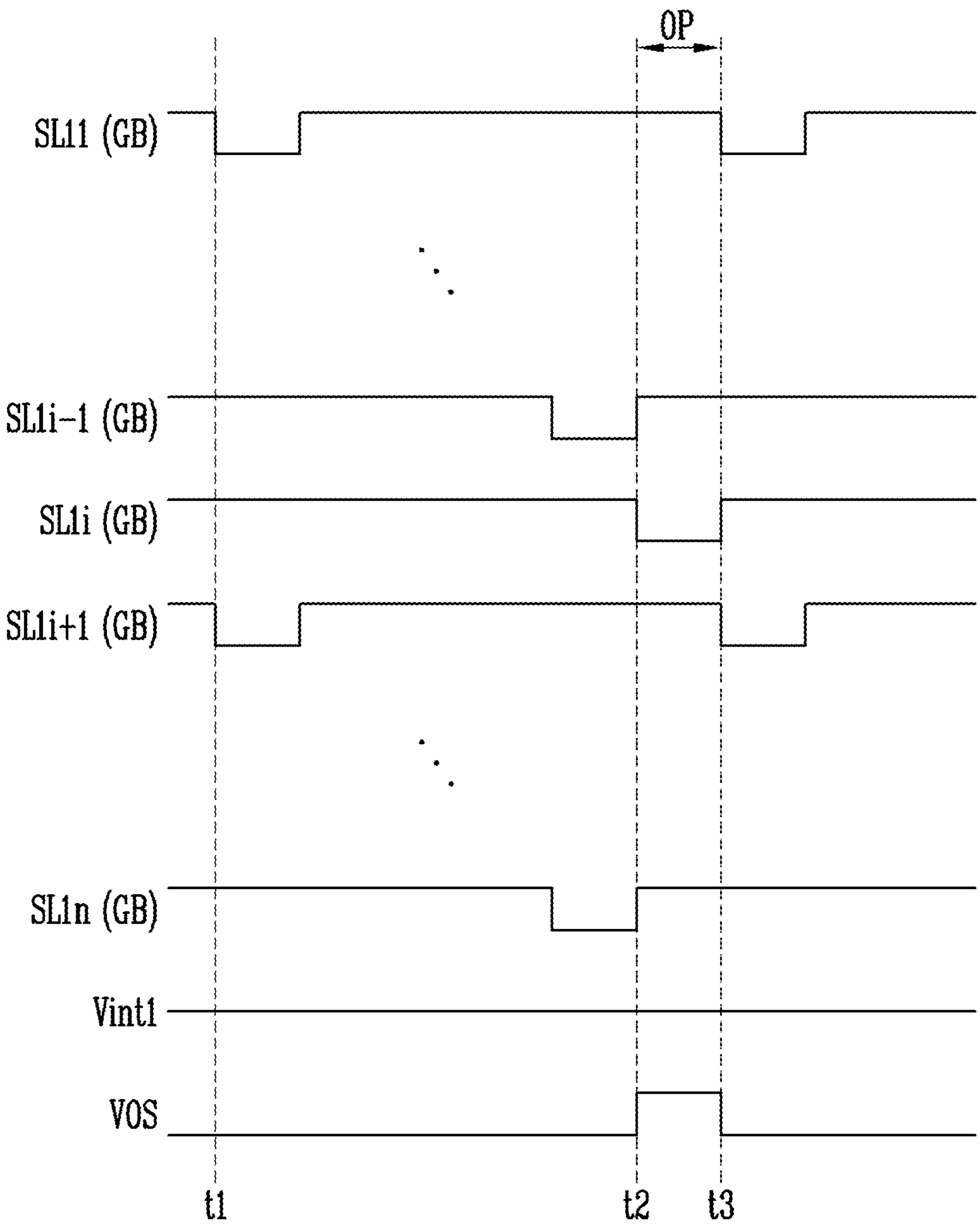
FIG. 6 is a drawing showing a voltage applied to a third power line during one frame period.

FIG. 6 is a drawing showing a voltage applied to a third power line during one frame period. Because the first scan signals SL11 to SL1*n* supplied to the first scan line during one frame period shown in FIG. 6 are similar to the first scan signals SL11 to SL1*n* supplied to the first scan line during one frame period shown in FIG. 5, repeated or overlapping descriptions may be omitted.

Referring to FIGS. 5 and 6, the offset voltage VOS applied in the second period is shown so that the voltage of the first initialization power supply Vint1 supplied in the first period and the second period is maintained to be substantially constant.

The power supply 600 (see FIG. 1) may apply the first voltage to the third power line during the first period, and may apply the second voltage to the third power line during the second period. The second voltage may be larger than the first voltage.

For example, the power supply 600 may apply the second voltage having a value that is a sum of the first voltage and the offset voltage VOS to the third power line to compensate for the reduced first initialization power supply Vint1 during the offset period OP between the time point t2 and the time point t3 when the load is reduced. The offset voltage VOS may have a value of the voltage of the initialization power supply Vint1 that decreases as the number of the load connected to the third power line decreases.

Accordingly, the voltage of the first initialization power supply Vint1 output to the pixel circuit may be maintained constant during the first period and the second period.

In one or more other embodiments, the pulse width of the first scan signal GB applied during the offset period OP may be reduced, thereby reducing the time for which the first initialization power supply Vint1 is applied.

By further applying the offset voltage VOS during the period OP during which the load of the initialization power line decreases, the initialization power supply of substantially the same voltage may be supplied to the pixels, thereby improving display quality.

Figure 7:
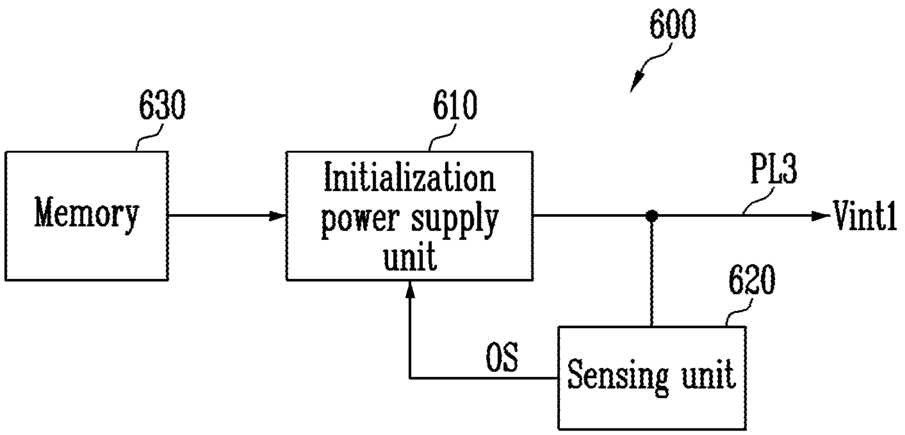
FIG. 7 is a drawing showing a power supply according to one or more embodiments of the present disclosure.

FIG. 7 is a drawing showing a power supply according to one or more embodiments of the present disclosure. In FIG. 7, only the configuration suitable for description of the present disclosure is shown.

Referring to FIG. 7, the power supply 600 may include an initialization power supply 610, a sensor (e.g., sensing unit) 620, and a memory 630.

The initialization power supply 610 may supply the voltage of the first initialization power supply Vint1 (or initialization power supply) to the third power line PL3 (or initialization power line). For example, the initialization power supply 610 may include a DC-DC converter, a low dropout regulator (LDO), or another type of regulator.

The sensor 620 may be connected to the third power line PL3, and may sense the voltage and/or current of the third power line PL3. Hereinafter, for convenience of description, it will be described that the sensor 620 senses the voltage of the third power line PL3.

Voltages sensed by the sensor 620 may be different from each other in the first period and the second period. For example, the first period may have a higher load than the second period, and accordingly, the voltage of the third power line PL3 may be different from each other in the first period and the second period.

When the voltage of the third power line PL3 corresponds to the second period, the sensor 620 may generate an offset signal OS so that the second voltage is applied to the third power line PL3.

When the initialization power supply 610 receives the offset signal OS, the initialization power supply 610 may supply the second voltage to the third power line PL3. When the initialization power supply 610 does not receive the offset signal OS, the initialization power supply 610 may supply the first voltage to the third power line PL3.

The memory 630 may store the value of the second voltage. When receiving the offset signal OS, the initialization power supply 610 may supply the second voltage to the third power line PL3 based on the value of the second voltage stored in the memory 630.

Figure 8:
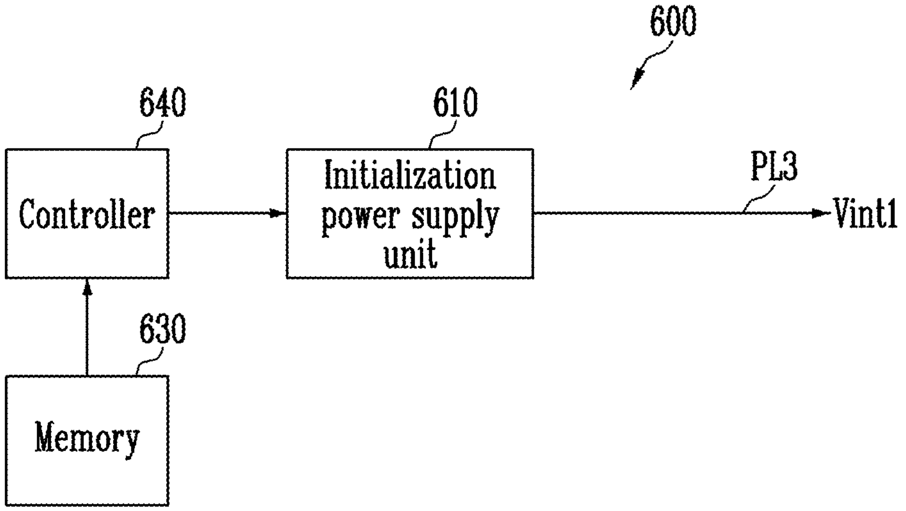
FIG. 8 is a drawing showing a power supply according to one or more embodiments of the present disclosure.

FIG. 8 is a drawing showing a power supply according to one or more embodiments of the present disclosure. When describing FIG. 8, the same reference numerals will be assigned to the same components as those of FIG. 7, and repeated or overlapping descriptions may be omitted.

Referring to FIG. 8, the power supply 600 may include an initialization power supply 610, a memory 630, and a controller 640.

The memory 630 may store the start and end points of the second period and the value of the second voltage.

The controller 640 may control the initialization power supply 610 based on the memory 630. For example, the controller 640 may control the initialization power supply 610 to supply the second voltage to the third power line PL3 during the second period based on data stored in the memory 630.

Figure 9:
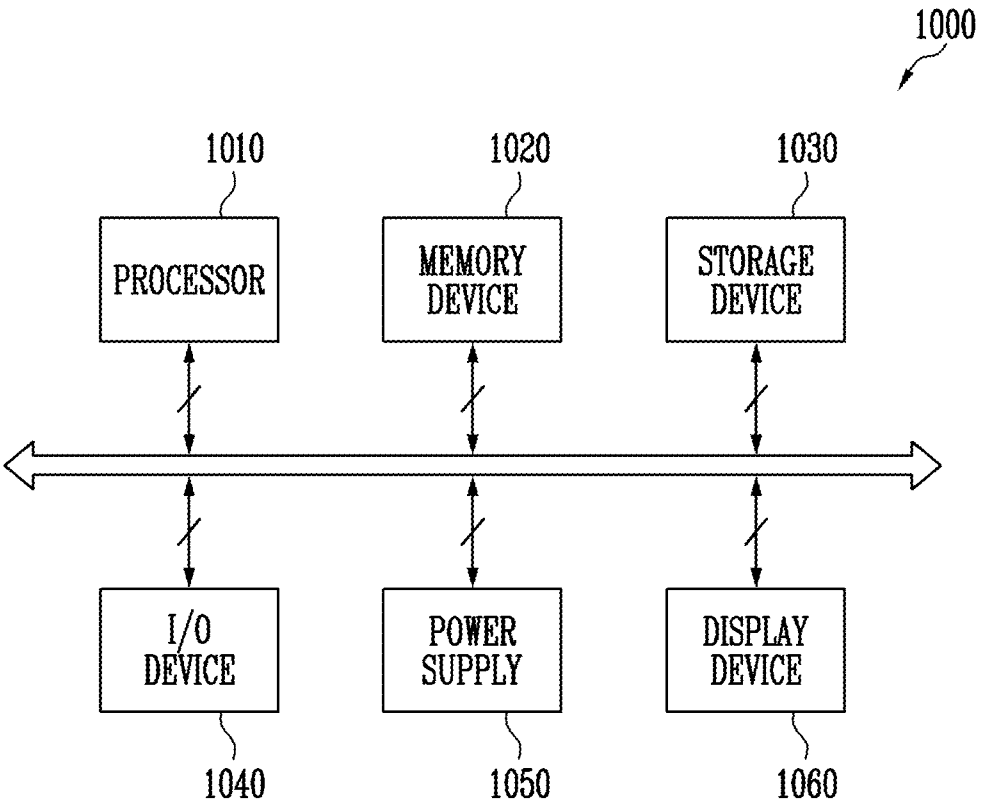
FIG. 9 is a block diagram illustrating an electronic device in accordance with embodiments of the present disclosure.
Figure 10:
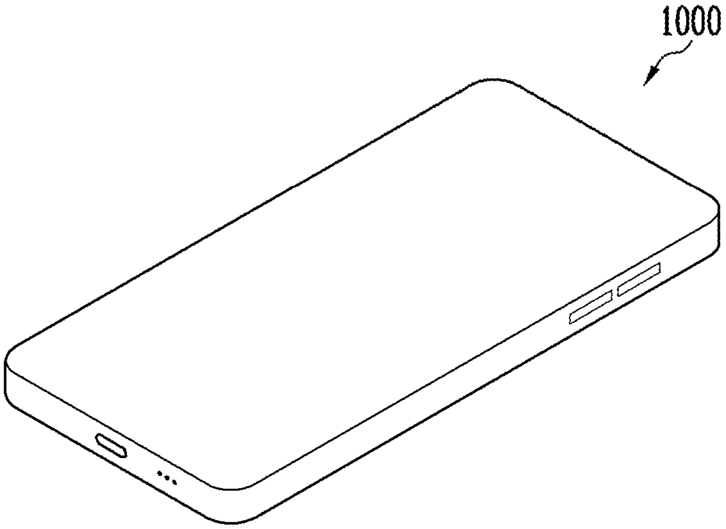
FIG. 10 is a schematic diagram illustrating an example where the electronic device of FIG. 9 is a smartphone.
Figure 11:
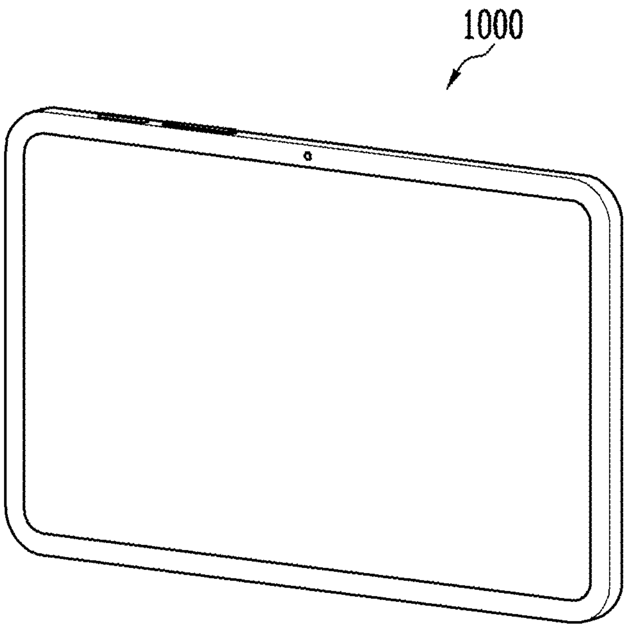
FIG. 11 is a schematic diagram illustrating an example where the electronic device of FIG. 9 is a tablet computer.

FIG. 9 is a block diagram illustrating an electronic device 1000 in accordance with embodiments of the present disclosure. FIG. 10 is a diagram illustrating an example where the electronic device 1000 of FIG. 9 is a smartphone. FIG. 11 is a schematic diagram illustrating an example where the electronic device 1000 of FIG. 9 is a tablet computer.

Referring to FIGS. 9 to 11, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems. In an embodiment, as illustrated in FIG. 10, the electronic device 1000 may be implemented as a smartphone. In an embodiment, as illustrated in FIG. 11, the electronic device 1000 may be implemented as a table computer. However, the aforementioned examples are illustrative, and the electronic device 1000 is not limited to the aforementioned examples. For example, the electronic device 1000 may be implemented as a cellular phone, a video phone, a smart pad, a smartwatch, a navigation device for vehicles, a computer monitor, a laptop computer, a head-mounted display device, and so on.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

Although the above has been described with reference to the embodiments of the present disclosure, those skilled in the art will understand that various modifications and changes can be made to the present disclosure without departing from the spirit and scope of the present disclosure as set forth in the claims, with functional equivalents thereof to be included therein.

What is claimed is:

1. A display device comprising:

a pixel comprising an initialization transistor configured to receive a voltage from an initialization power line; and an initialization power supply configured to supply a first voltage as the voltage, and configured to supply a second voltage as the voltage, which is larger than the first voltage, to the initialization power line during an offset period when a load connected to the initialization power line is reduced during one frame period, wherein the second voltage has a value that is a sum of the first voltage and an offset voltage that has a value of the voltage of the initialization power supply that decreases as the load connected to the initialization power line decreases.

2. The display device of claim 1, wherein the initialization power supply is configured to supply the first voltage to the initialization power line during a period other than the offset period of the one frame period.

3. The display device of claim 1, further comprising a sensor configured to sense the voltage of the initialization power line, and to control the initialization power supply in response to a sensed voltage.

4. The display device of claim 3, wherein an offset signal is configured to be output to the initialization power supply when the sensor senses a decrease in the voltage of the initialization power line, and wherein the initialization power supply is configured to supply the second voltage to the initialization power line upon receiving the offset signal.

5. The display device of claim 4, further comprising a memory configured to store a value of the second voltage, wherein the initialization power supply is configured to supply the second voltage to the initialization power line based on the value of the second voltage stored in the memory upon receiving the offset signal.

6. The display device of claim 1, further comprising:

a memory configured to store start and end points of the offset period, and to store a value of the second voltage; and a controller configured to control the initialization power supply.

7. The display device of claim 6, wherein the controller is configured to control the initialization power supply to supply the second voltage to the initialization power line during the offset period.

8. The display device of claim 1, wherein the initialization transistor is configured to be turned on when a first scan signal is supplied to a first scan line, and wherein the first scan signal is configured to be supplied at least twice during the one frame period.

9. A driving method of a display device, the method comprising:

supplying a first voltage from an initialization power supply to a pixel through an initialization power line during a first period of one frame period; and supplying a second voltage, which is larger than the first voltage, from the initialization power supply to the pixel during a second period of the one frame period after the first period, and during which a load connected to the initialization power line is reduced, wherein the second voltage has a value that is a sum of the first voltage and an offset voltage that has a value of the voltage of the initialization power supply that decreases as the load connected to the initialization power line decreases.

10. The driving method of claim 9, wherein the load connected to the initialization power line during the first period is different from the load connected to the initialization power line during the second period.

11. The driving method of claim 9, further comprising supplying the initialization power supply having the first voltage to the pixel during a third period after the second period of the one frame period.

12. The driving method of claim 9, further comprising supplying, to the pixel, the voltage of the initialization power supply at least twice during the one frame period.

13. An electronic device, comprising:

a processor to provide input image data; and a display device to display an image based on the input image data, wherein the display device comprises:

a pixel comprising an initialization transistor configured to receive a voltage from an initialization power line; and an initialization power supply configured to supply a first voltage as the voltage, and configured to supply a second voltage as the voltage, which is larger than the first voltage, to the initialization power line during an offset period when a load connected to the initialization power line is reduced during one frame period, wherein the second voltage has a value that is a sum of the first voltage and an offset voltage that has a value of the voltage of the initialization power supply that decreases as the load connected to the initialization power line decreases.

* * * * *